(12) United States Patent
Zafiroglu

(10) Patent No.: US 6,407,018 B1
(45) Date of Patent: *Jun. 18, 2002

(54) STITCHBONDED FABRIC AND PROCESS FOR MAKING SAME

(75) Inventor: Dimitri Peter Zafiroglu, Wilmington, DE (US)

(73) Assignee: Xymid, L.L.C., Petersburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/253,863

(22) Filed: Feb. 19, 1999

Related U.S. Application Data

(62) Division of application No. 08/931,017, filed on Sep. 15, 1997, now Pat. No. 5,879,779, which is a continuation-in-part of application No. 08/872,794, filed on Jun. 10, 1997, which is a division of application No. 08/625,058, filed on Mar. 29, 1996, now Pat. No. 5,707,710.

(51) Int. Cl.⁷ .................................................. D04H 3/10
(52) U.S. Cl. ........................ 442/336; 442/366; 428/102; 428/152; 428/221
(58) Field of Search ................................ 442/366, 336; 428/102, 152, 221

(56) References Cited

U.S. PATENT DOCUMENTS

| 4,704,321 A | | 11/1987 | Zafiroglu | |
|---|---|---|---|---|
| 4,737,394 A | | 4/1988 | Zafiroglu | |
| 4,773,238 A | | 9/1988 | Zafiroglu | |
| 4,876,128 A | | 10/1989 | Zafiroglu | |
| 5,174,228 A | * | 12/1992 | Grimnes | 428/102 |
| 5,308,674 A | | 5/1994 | Zafiroglu | |
| 5,310,590 A | | 5/1994 | Tochacek et al. | |
| 5,418,044 A | * | 5/1995 | Mahler | 428/196 |
| 5,634,997 A | | 6/1997 | Anzilotti et al. | |
| 5,707,710 A | | 1/1998 | Zafiroglu | |

FOREIGN PATENT DOCUMENTS

| EP | 0 337 687 A2 | 10/1989 |
|---|---|---|
| EP | 0 390 579 A1 | 10/1994 |
| WO | WO94/19523 A1 | 1/1994 |

\* cited by examiner

*Primary Examiner*—Elizabeth M. Cole
(74) *Attorney, Agent, or Firm*—Lawrence Isakoff

(57) ABSTRACT

An improved stitchbonded nonwoven fabric having repeating patterns of stitches in a fibrous layer is prepared with a stitching thread that consists essentially of fiber of partially molecularly oriented synthetic organic polymer. The fabric can be stretched, shrunken, and/or heat set and is particularly suited for thermoforming operations.

6 Claims, 1 Drawing Sheet

STITCHBONDED FABRIC AND PROCESS FOR MAKING SAME

CROSS-REFERENCE TO RELATED APPLICATIONS

This application is a divisional application of pending application Ser. No. 08/931,017, field Sep. 15, 1993 now U.S. Pat. No. 5,879,779, dated Mar. 9, 1999, which was a continuation-in-part application of pending application Serial No. 08/872,794, filed Jun. 10, 1997, which was a divisional application of application Ser. No. 08/625,058, filed Mar. 29, 1996 now U.S. Pat. No. 5,707,710 dated Jan. 13, 1998.

BACKGROUND OF THE INVENTION

1. Field of the Invention

This invention relates to a stitchbonded nonwoven fabric and a process for making such fabric. More particularly, the invention concerns a stitchbonded fabric having a pattern of stitches formed by a stitching thread that comprises fibers consisting essentially of partially oriented synthetic organic polymer. The stitchbonded nonwoven fabric is particularly suited for use in thermoformed objects, such as automobile dashboards and headliners, office separator walls, wall coverings, plastic-coated or resin-impregnated fabrics and the like.

2. Description of the Prior Art

Stitchbonded nonwoven fabrics and processes and machines for making such fabric are known.

Stitchbonded nonwoven fabric is made by multi-needle stitching of a fibrous layer with one or more stitching thread systems to form patterns of stitches in the layer. Known processes for making a stitchbonded nonwoven fabric typically include the steps of (a) feeding a fibrous layer to a stitchbonding machine; (b) threading a multi-needle bar of the stitchbonding machine with stitching threads; (c) inserting the stitching thread into the fibrous layer to form a pattern of spaced apart, interconnected rows of stitches, thereby creating the stitchbonded fabric; (d) removing the stitchbonded fabric from the stitchbonding machine; and (e) optionally subjecting the stitchbonded fabric to further textile finishing operations, such as shrinking, heat setting, molding, coating, impregnating and the like.

Stitchbonded nonwoven fabrics that include stitching threads of conventional, fully drawn, crystalline polymeric yarns (also called "hard yarns") are known. Although the use of stitching threads of such fully drawn yarns has been quite successful in many stitchbonded fabrics, such fabrics nonetheless have certain shortcomings. For example, such stitchbonded fabrics, although dimensionally stable, usually perform inadequately in molding or thermoforming operations.

Stitchbonded nonwoven fabrics that include stitching threads of spandex elastic yarns, which are capable of elongating and contracting in the range of 100 to 250%, also are known. (Spandex is a generic term for a manufactured fiber in which the fiber-forming substance is a long chain elastomer comprised of at least 85% segmented polyurethane.) The use of such elastic stitching thread, with or without an accompanying non-elastic thread, is disclosed in my earlier patents; for example, in U.S. Pat. Nos. 4,876,128, 4,773,238, 4,737,394 and 4,704,321 for making bulky and/or stretchy stitchbonded fabrics, in WO 94/19523 for making abrasion-resistant resin-impregnated stitchbonded fabrics, and in U.S. Pat. No. 5,308,674 for making tear-resistant stitchbonded fabric. According to the processes disclosed in each of these patents, the stitchbonded fabric, immediately upon removal from the multi-needle stitching operation, is allowed to shrink and gather and thereby undergo a significant reduction in fabric area. Although such spandex-containing stitchbonded nonwoven fabrics have been used successfully in a variety of products, further improvements, particularly in dimensional stability, would result in broader use of stitchbonded nonwoven fabrics. Accordingly, a stitchbonded fabric is desired that has lower costs and fewer special handling and stitching control requirements than those associated with stitchbonded fabric containing spandex elastic yarn.

SUMMARY OF THE INVENTION

The present invention provides an improved stitchbonded nonwoven fabric. The fabric is of the type that includes a fibrous layer and patterns of stitches inserted therein with stitching threads. According to the improvement of the invention, at least one stitching thread consists essentially of fiber of partially molecularly oriented synthetic organic polymer. In one preferred embodiment, all the stitching thread is yarn of fiber of such partially oriented polymer. In another embodiment of the invention, the stitchbonded fabric has additional patterns of stitches formed by stitching threads of textured yarn of drawn fiber of synthetic organic polymer.

The present invention also provides an improved process for making the above-described stitchbonded nonwoven fabric. The process is of the type that includes feeding a layer of substantially nonbonded fibers to a stitchbonding machine having at least one multi-needle stitching bar, threading a needle bar with stitching thread, inserting a pattern of stitches with the threaded multi-needle stitching bar into the layer of substantially nonbonded fibers to form the stitchbonded nonwoven fabric and then optionally subjecting the stitchbonded nonwoven fabric to stretching, shrinking, heat setting, coating, impregnating or other textile operations. The improvement of the process of the invention comprises the stitching thread in at least one multi-needle stitching bar consisting essentially of fiber of partially molecularly oriented synthetic organic polymer. A preferred stitching thread consists essentially of fibers of partially molecularly oriented polyester.

BRIEF DESCRIPTION OF THE DRAWINGS

Equipment for testing molding characteristics of stitchbonded nonwoven fabrics of the invention is depicted in the drawings in which.

DETAILED DESCRIPTION OF PREFERRED EMBODIMENTS

Figure 1:
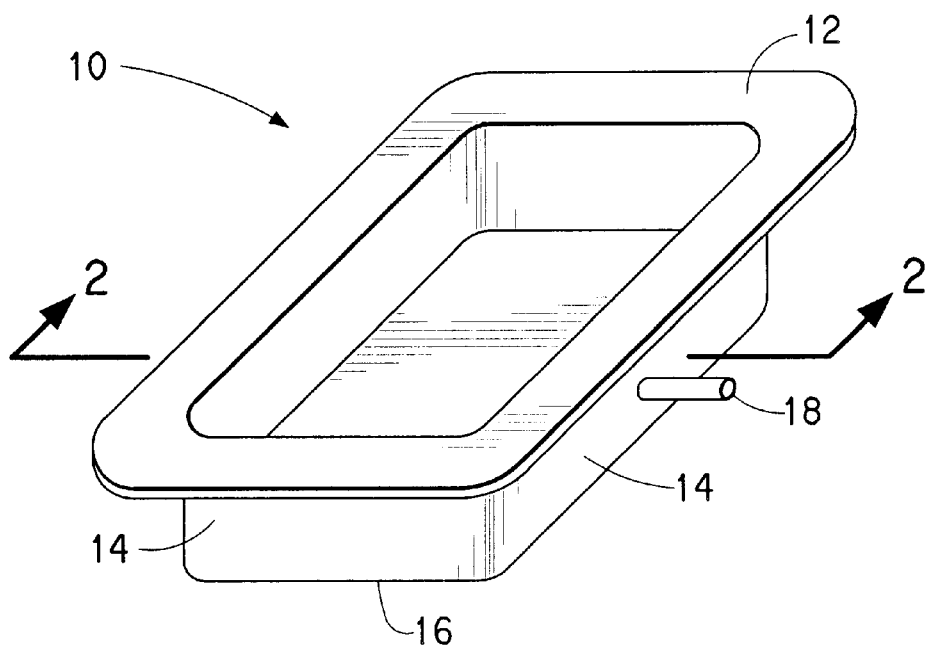
FIG. 1 is an isometric representation of metal tub 10, having an open top surrounded by wide lip 12 attached to the periphery of vertical sides 14, solid bottom 16, and tube 18 for connection to a vacuum pump (not shown)

The following detailed description of preferred embodiments of the invention is included for purposes of illustration and is not intended to limit the scope of the invention. The scope is defined by the appended claims.

As used herein, the term "fiber of partially molecularly oriented polymer" means fiber of synthetic organic crystalline polymer that has substantial molecular orientation, but which still can achieve further molecular orientation. Yarn of partially molecularly oriented fiber, sometimes referred to herein as "POY", is suited for use as stitching thread in the present invention and typically has a break elongation in the range of 50 to 150%. By comparison, "undrawn fiber" (i.e., fiber that is melt-spun at low speed and is not drawn) has a very small amount of molecular orientation and a break elongation of greater than 150%, typically greater than 200%. Conventional fibers of synthetic organic crystalline polymer, such as fibers of polyester or polyamide, typically are fully drawn when used as stitching yarn and have break elongations in the range of 15 to 35%. The term "fiber" includes within its meaning filaments and staple fibers. The term "heat set temperature" refers to the temperature at which a stitchbonded fabric of the invention is heat treated, while being held at fixed dimensions, usually for no more than 90 seconds, to stabilize the dimensions of the fabric. As a result of such heat setting, the partially molecularly oriented polymer of the stitching yarn fibers becomes more oriented and the break elongation of the heat-set stitching yarn is decreased to less than 50%.

The stitchbonded nonwoven fabric of the invention is in many ways quite similar to conventional stitchbonded nonwoven fabrics. As with conventional stitchbonded fabrics, the fabric of the invention has a fibrous layer into which patterns of stitches were inserted with stitching threads. However, in accordance with the invention, at least one of the patterns of stitches was formed with stitching thread that consists essentially of fiber of partially molecularly oriented synthetic organic polymer (i.e., "POY" stitching thread).

Various fibrous layers can be used in the stitchbonded nonwoven fabrics of the invention, such as batts of carded fibers, air-laid fiber batts, wood-pulp papers, lightly bonded spunbonded sheets, spunlace fabrics of hydraulically entangled fibers, non-bonded nonwoven sheets, and the like. The fibers of the fibrous layers can be natural fibers or of synthetic organic polymer. Usually, nonbonded fibrous layers are preferred, but lightly bonded or bonded layers can be employed as long as the bonding does not interfere with the stretching, contracting or molding of the subsequently produced stitchbonded fabric.

Typical synthetic organic polymers suitable for the fiber of the POY stitching thread include 66-nylon, 6-nylon, polyethylene terephthalate, polybutylene terephthalate, cationic dyeable polyester, and the like. POY fiber is usually made by a high-speed melt-spinning operation and typically is used as a feed yarn for making draw-twist textured yarns. Stitching thread of POY fiber typically has the capability of significant shrinkage when subjected, without restraint, to a low temperature heat treatment. For example, many a POY yarn can shrink to less than half its original length when immersed in boiling water. Also, typical POY fiber can be heat set, while being held at constant dimensions, at temperature that is in the range of 120 to 190° C. The higher portion of the heat-setting temperature range (e.g., 165 to 190° C.) is preferred because the higher temperatures permit shorter exposure times to set the synthetic organic polymeric fibers.

In accordance with the invention, a wide variety of stitch patterns of POY stitching thread, and optionally other stitching threads, can be present in the stitchbonded fabric of the invention. As a result of the pattern of POY stitches in the nonwoven stitchbonded fabric, such fabric has considerable versatility in use. The fabric can be caused to shrink by being immersed in a relaxed condition in boiling water, or by being heated in a relaxed condition in air. The shrinkage can reduce the length and/or width of the fabric to less than 50% of the as-stitched dimensions and the planar area to less than 25% of its as-stitched area, while significantly increasing the thickness of the fabric over its as-stitched thickness. In a preferred embodiment of the process of the invention, the as-stitched fabric is contracted to less than one-half its as-stitched area. Alternatively, the fabric can be stretched at room temperature or while heated. When stretched at room temperature, the amount of linear stretch typically is no greater than 50%, usually in the range of 20 to 30%. When heated, the amount of linear stretch can be as great as 300%, or more and the planar area of the fabric can be increased to an area that is greater than 3.5 times the as-stitched area. The amount that the fabric can be stretched or shrunken depends on, among other things, the stitch pattern employed, whether the fabric includes inelastic drawn yarns in some accompanying stitch pattern in the fibrous layer, and the temperature at which the stretching or shrinking is performed. The fabric can be heat set in an as-stitched, as-shrunken, or as-stretched condition to provide a dimensionally stable, inelastic fabric. In another preferred embodiment of the process of the invention, the as-stitched fabric is stretched by at least 25% in its longitudinal and/or transverse dimension and then heat set-while in the stretched condition.

The process for preparing the stitchbonded nonwoven fabric of the invention includes various known steps that can be performed with conventional equipment. The stitching step can be performed with a conventional multi-needle stitching machine equipped with one or more multi-needle bars. Malimo or Liba stitching machines are particularly useful. However, to obtain the advantageous characteristics of the fabric of the invention, at least one of the patterns of stitches in the stitchbonded fabric must be formed with stitching thread of partially molecularly oriented polymer fiber.

Test Procedures

In the preceding description of the invention and in the examples below, certain characteristics are mentioned. Unless indicated otherwise, these characteristics were determined by the following procedures.

The weight per unit area of the starting fibrous layer and of the stitchbonded fabric is measured according to ASTM Method D 3776–79. Break elongation of yarn is measured according to ASTM Method D 2256. The total thickness of a fabric is measured with a touch micrometer having a ¼-inch (0.64-cm) diameter flat cylindrical probe which applies a 10-gram load to the contacted surface of the fabric. The thicknesses of various layers within the stitchbonded fabric can be determined from magnified photomicrographs (e.g., at 15–20×) of the cross-section of the fabric.

Figure 2:
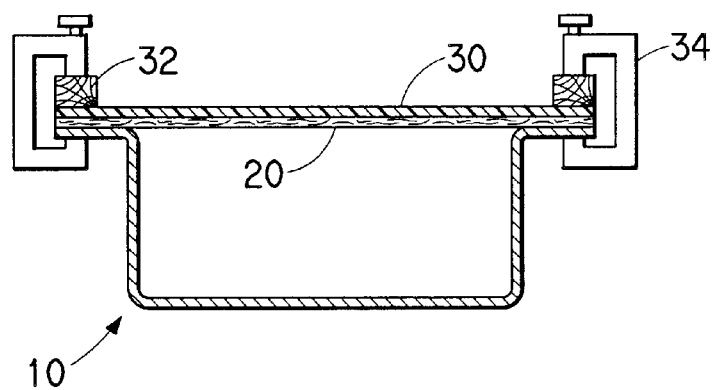
FIG. 2 is a schematic cross-section of tub 10, taken through section 2—2 of FIG. 1, with stitchbonded fabric sample 20 shown covering the top opening of tub 10, sheet 30 resting atop sample 20, and sample 20 and sheet 30 being held in place by wooden flange 32 and metal C-clamps 34, prior to air being evacuated from tub 10.

The molding, or thermoforming, characteristics of a stitchbonded fabric of the invention is determined with the apparatus illustrated in FIGS. 1 and 2. A stitchbonded fabric test specimen 20 is placed flat over the opening in the top of stainless steel tub 10. The opening measures 24 cm in length and 16 cm in width. The tub is 8 cm deep . Lip 12 of tub 10 is 5-cm wide. All corners and intersections between sides 14 and bottom 16 and between sides 14 and lip 12 are rounded with a radius of about 5 cm. Fabric 20, with cover sheet 30 atop fabric 20 are clamped in place to form a seal around the lip of the tub. Air is then sucked from the thusly assembled equipment to reduce the pressure within the covered tub to about 0.5 atmosphere. The equipment is then placed in a heated oven for ten minutes. After the equipment is removed from the oven, atmospheric pressure is restored in the tub, the cover sheet is removed and the fabric is allowed to cool. Observations are then made to determine how well the fabric conforms to the shape of the tub. In the examples below, this test is referred to as the "Moldability Test".

The hot stretch characteristics of stitchbonded fabric in the longitudinal direction (i.e., parallel to the direction of the rows of stitches) and in the transverse direction (i.e., perpendicular to the longitudinal direction) are determined on fabric samples that are 20 cm-long by 2.5-cm wide. For longitudinal stretch measurements, the 20-cm length is parallel to the rows of stitches. For transverse stretch measurements, the 20-cm length is transverse to the rows of stitches. The sample is suspended between two 5-cm wide clamps that are set 10-cm apart (thereby providing a 10-cm long initial "gauge length", $L_i$). A 2-Kg weight is suspended from the lower clamp and the thusly formed assembly is hung for 5 minutes in an oven heated to 370° F. (188° C.). After the sample is removed from the oven, released from the clamps, and cooled, the stretched gauge length, $L_f$, of the sample is measured. The % stretch is then equal to $100(L_f-L_i)/L_i$.

EXAMPLES

The Examples below illustrate preparation of stitchbonded nonwoven fabrics of the invention and various ways in which the stitchbonded fabrics are treated and utilized. The stitchbonded fabric in each example was produced on a 144-inch (3.66-meter) wide, two-bar LIBA stitchbonding machine. Each bar of the machine was 14-gauge, that is, each bar had 14 needles per inch (7.1/cm ), except in Example 1, wherein 18-gauge bars were employed. Conventional warp-knitting nomenclature is used to describe the repeating stitch patterns that were employed in preparing the fabric.

Example 1

This example illustrates the preparation of a stitchbonded sheet of the invention made with two types of stitching threads; (1) a thread of partially molecularly oriented polyester fiber and (2) a thread of textured polyester yarn. The fabric was then contracted and partially impregnated with resin to form a composite sheet that was particularly useful as artificial leather.

A fibrous layer of Style 8017 SONTARA® spunlace nonwoven fabric (sold by E. I. du Pont de Nemours & Co.), weighing 24 g/m² (0.7 oz/yd²) was overfed by 56% to the two-bar stitchbonding machine. The fibrous layer was composed of polyethylene terephthalate fibers of 1.35 denier (1.5 dtex) per filament and ⅞-inch (2.2-cm) length. Each bar had 18 needles per inch (7.1/cm) parallel to the width dimension of the machine and inserted 14 stitches per inch (7.1/cm) in the longitudinal direction of the fibrous layer. Both bars were fully threaded. The front bar inserted a 1–0, 3–4 pattern of stitches with 34-filament 200-denier (220-dtex) partially molecularly oriented polyester yarn. The back bar inserted a 3–4, 1–0 pattern of stitches with 34-filament 70-denier (78-dtex) textured polyester yarn. The as-stitched fabric weighed 135 g/m², of which the fibers of the spunlaced fibrous layer weighed 37 g/m², the stitching of partially molecularly oriented polyester yarn weighed 27 g/m², and the stitching of textured polyester yarn weighed 71 g/m². The as-stitched fabric was immersed in boiling water for about one minute, dried and then heat set on a tenter at 347° F. (175° C.) to effect a shrinkage to about one-fourth of the as-stitched area. The contracted fabric weighed 544 g/m². As a result of the construction and contraction of the stitched fabric, the partially molecularly oriented polyester stitching yarns formed a planar network located within the thickness of the contracted fabric while the spunlaced fibrous layer and the textured polyester stitching fibers buckled and formed outer layers above and below the planar network. The planar network occupied about as one-fifth of the total thickness of the 1.4-mm total thickness of the contracted fabric. The upper outer layer was 0.6-mm thick and weighed 152 g/m². The lower outer layer was 0.5-mm thick and weighed 42 g/m².

The contracted stitchbonded fabric described in the preceding paragraph provided an excellent substrate for an artificial leather, which was made as follows. A sample of the contracted stitchbonded fabric was resin treated to effect partial impregnation of the resin into the upper outer layer of the fabric. Bayer 638512 (sold by Bayer AG of Germany), a two part polyurethane resin composition, was applied by brush to the contracted stitchbonded fabric. The resin then was cured in an oven at a temperature of 65° C. The resin penetrated the fabric to a depth of about 0.30 mm and provided a thin (approximately 0.1-mm thick) extra coating atop the resin-impregnated layer. The thusly resin-impregnated stitchbonded fabric of the invention was judged to possess not only highly desirable leather-like characteristics of stretchability, compressibility, flexibility, recovery, moisture retention, tensile strength and tear strength, but also a surface layer that could be attractively embossed.

Example 2

This example describes the preparation of a two-bar stitchbonded nonwoven fabric of the invention, one bar providing POY stitching thread and the second bar providing conventional textured stitching thread. Molding of the produced fabric is also described.

A fibrous layer of Style 8034 SONTARA® spunlace fabric, weighing 24 g/m² (0.7 oz/yd²) was overfed by 56% to a two-bar stitchbonding machine. The effective weight of the fibrous layer fed to the machine was 37.5 g/m². The fibrous layer was composed of polyethylene terephthalate fibers of 1.35 denier (1.5 dtex) per filament and ⅞-inch (2.2-cm) length. Both of the 14-gauge bars of the stitchbonding machine were fully threaded, the back bar with a POY polyester stitching thread and the front bar with a textured polyester stitching thread. Each bar inserted 24 courses of stitches per inch (9.4/cm) in the machine direction (i.e., longitudinal direction). The back bar stitching thread was supplied from a warp beam on which 34-filament, 255-denier (280-dtex) POY DACRON® polyester (sold by E. I. du Pont de Nemours & Co. had been wound at low stretch so that the stitching thread being fed to the back bar was of 240 den (260 dtex). The back bar inserted a repeating pattern 1–0, 4–5 stitches into the fibrous layer. The front bar stitching yarn was a 34-filament, 70-den (78-dtex) textured yarn of DACRON® polyester. The front bar inserted a repeating pattern of 3–4, 1–0 stitches. The as-stitched weight of the stitchbonded fabric was 183 g/m² (5.4 oz/yd²). The as-stitched stitchbonded fabric was passed rapidly through boiling water in a conventional padder whereupon the fabric shrank (a) in the transverse direction from 144 inches (3.66 meters) to 60 inches (1.52 meters), or to about 42% of its original as-stitched width and (b) in the longitudinal direction to about 90% of its original as-stitched length. The shrunken fabric was then held at the shrunken dimensions on a tenter frame and heat set at 350° F. (177° C.) for 30 seconds.

The hot stretch characteristics of the shrunken and heat set fabric were measured at a temperature of 370° F. (188° C.), a temperature that was 20° F. (11° C.) above the temperature at which the shrunken fabric had been heat set. The fabric exhibited a percent stretch while hot of 165% in the longitudinal direction and of 310% in the transverse direction (based on the corresponding shrunken-and-heat-set dimensions). After the hot-stretch samples were removed from the oven and allowed to cool, the final dimensional changes in the longitudinal and transverse directions of the fabric (compared to the corresponding shrunken-and-heat-set dimensions) were respectively 155% and 290%. The final dimensions of the thusly treated fabric were stable and the fabric itself was not substantially stretchable at temperatures below 370° F. (188° C.).

The as-stitched stitchbonded fabric of the example was also subjected to a Moldability Test. A cover sheet 30 of silicone rubber was used in this test and the partially evacuated assembly was placed in an oven heated to 380° F. (193° C.) for 10 minutes. After the assembly was removed from the oven and cooled, the atmosphere in the tub was restored and the stitchbonded fabric was separated from the apparatus. The fabric retained the exact inner dimensions and contours of the metal tub.

Example 3

This example describes preparation of a stitchbonded nonwoven fabric of the invention in which all the patterns of stitches were formed with the stitching yarns of fibers of partially molecularly oriented synthetic organic polymer. The example also describes use of the fabric in molding operations.

Two layers of SONTARA® Style 8034 spunlace fabric (described in Example 2 above), one atop the other, were overfed 50% into the stitchbonding machine to provide a starting fibrous layer of 71 g/m² (2.1 oz/yd²). The front and the back bars of the machine were fully threaded with 34-filament POY DACRON® polyester stitching thread, that had been slightly stretched from 125 den (112 dtex) to 120 den (110 dtex) when placed on warp beams. Each bar inserted 14 courses of stitches per inch (5.5/cm). The back bar inserted into the fibrous layer a pattern of 1–2, 1–0 tricot stitches and the front inserted 1–0, 1–2 tricot stitches. The as stitched fabric weighed 115 g/m² (3.4 oz/yd²). The as-stitched fabric was then stretched on a tenter frame by 40% in each the longitudinal and transverse directions while being heat set at 350° F. (177° C.) for 30 seconds. The resultant stretched and heat set fabric was dimensionally stable at room temperature and had a soft feel which was provided by the staple fibers of the fibrous layer of SONTARA® spunlace fabrous layer.

The stitched, stretched and heat-set fabric of the invention described in the preceding paragraph was then placed on a 33.9 g/m² (1.0 oz/yd²) SHARNET® thermoplastic adhesive sheet (sold by AET of Middletown, Del.) which rested upon a ½-inch (1.3-cm) thick fiberglass batt. The melting temperature of the adhesive was 210° F. (99° C.). Samples of the thusly formed assembly were placed under a pressure 15 psi (103 KiloPascals) for one minute in a platen press heated to 390° F. (199° C.). Two types of molded samples were produced. One sample was molded in a press in which both platens were flat. A second sample was molded in a press in which the platens provided matched concave and convex surfaces. The flat molded material was used satisfactorily in flat wall panels and the material from the press with the matching shaped platens was used satisfactorily in automobile headliners.

Example 4

This example describes another stitchbonded nonwoven fabric of the invention in which all the patterns of stitches are formed with POY polyester stitching thread and use of the stitchbonded fabric in a thermoformed composite structure.

Two layers of carded-and-point-bonded polypropylene fibers (sold by Fibertex, Inc.), one layer atop the other, each weighing 0.9 oz/yd² (30.5 g/m²), was fed with no overfeed to the stitchbonding machine. Each bar was fully threaded with the same POY polyester stitching thread as was used in Example 3 and formed into the same number of courses per unit length of fabric as in Example 3. The back bar inserted a repeating pattern of 1–0,3–4 stitches and the front bar inserted a repeating pattern of 3–4,1–0 stitches. The resultant stitchbonded fabric was readily stretchable in air at a temperature of 212° F. (100° C.) to at least twice its original longitudinal and transverse dimensions (i.e., to 4 times its as-stitched area).

To demonstrate the excellent thermoforming characteristics of the stitchbonded nonwoven fabric of the preceding paragraph, the as-stitchbonded fabric was formed into a composite sheet and subjected to the Moldability Test, as follows. A 3.0-mm thick sheet of polymethylmethacrylate (abbreviated "PMMA" hereinafter) was sanded on one face and a 0.5-oz/yd² (17-g/m²) layer of DUCO® acrylic cement was spread on the sanded face. The stitchbonded fabric was then placed atop the cement layer and the thusly formed assembly was placed in an unheated platen press for 5 minutes at 80 psi (551 KPascals). The fabric bonded firmly to the PMMA sheet to form a composite sheet which was then subjected to the Moldability Test. The test was performed in an oven at a temperature 400° F. (204° C.) but with no elastic cover sheet 30 being used. The product of the Moldability Test was a molded stitchbonded fabric/PMMA composite structure whose contours uniformly matched those of the tub.

I claim:

1. An improved stitchbonded nonwoven fabric having a pattern of stitches formed by a stitching thread in a fibrous layer, wherein the improvement comprises the stitching thread of at least one pattern of stitches being a yarn of fiber consisting of partially molecularly oriented synthetic organic polymer and the fabric, upon being immersed in a relaxed condition in boiling water or being heated in a relaxed condition in air, being able to shrink to less than 50% of its as-stitched length and/or width.

2. A stitchbonded fabric in accordance with claim 1 wherein all the stitching thread is yarn of fiber of partially molecularly oriented synthetic organic polymer.

3. A stitchbonded fabric in accordance with claim 1 wherein the stitchbonded fabric also has a pattern of stitches provided by stitching threads of textured yarn of drawn fiber of synthetic organic polymer.

4. A stitchbonded fabric in accordance with claim 1 wherein the partially oriented synthetic organic polymer is a nylon or a polyester.

5. A stitchbonded fabric in accordance with claim 2 wherein the partially oriented synthetic organic polymer is a nylon or a polyester.

6. A stitchbonded fabric in accordance with claim 3 wherein the partially oriented synthetic organic polymer is a nylon or a polyester.

* * * * *